United States Patent
Ishibiki et al.

(10) Patent No.: US 11,825,198 B2
(45) Date of Patent: Nov. 21, 2023

(54) DRIVE DEVICE THAT DRIVES MOVABLE UNIT BY USING ACTUATOR, IMAGE BLUR CORRECTING DEVICE, IMAGE PICKUP APPARATUS, AND LENS BARREL

(71) Applicant: CANON KABUSHIKI KAISHA, Tokyo (JP)

(72) Inventors: Jumpei Ishibiki, Saitama (JP); Tatsuya Otoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 17/666,370

(22) Filed: Feb. 7, 2022

(65) Prior Publication Data

US 2022/0264013 A1  Aug. 18, 2022

(30) Foreign Application Priority Data

Feb. 15, 2021 (JP) ................................. 2021-021830
Apr. 28, 2021 (JP) ................................. 2021-076427

(51) Int. Cl.
*H04N 23/68* (2023.01)
*G03B 5/04* (2021.01)
(Continued)

(52) U.S. Cl.
CPC ......... *H04N 23/687* (2023.01); *G02B 27/646* (2013.01); *G03B 5/04* (2013.01);
(Continued)

(58) Field of Classification Search
CPC .... H04N 23/68; H04N 23/682; H04N 23/685; H04N 23/687; G02B 27/64;
(Continued)

(56) References Cited

U.S. PATENT DOCUMENTS

| 2015/0237259 A1* | 8/2015 | Yasuda | G02B 27/646 348/208.11 |
|---|---|---|---|
| 2023/0007177 A1* | 1/2023 | Ishibiki | H04N 23/50 |

FOREIGN PATENT DOCUMENTS

| JP | 2013140309 A | * | 7/2013 | ........... G02B 27/646 |
|---|---|---|---|---|
| JP | 6511495 B2 | | 5/2019 | |
| JP | 6719056 B2 | | 7/2020 | |

* cited by examiner

*Primary Examiner* — Paul M Berardesca
(74) *Attorney, Agent, or Firm* — Cowan, Liebowitz & Latman, P.C.

(57) ABSTRACT

A drive device that reduces a returning force to return to the center when moving a movable unit with respect to a fixed unit and suppresses a load of an actuator driving the movable unit is provided. The drive device includes a fixed unit, a movable unit that is disposed so as to be capable of relatively moving in a predetermined range within a plane with respect to the fixed unit, a plurality of rolling members that are disposed between the fixed unit and the movable unit, an actuator configured to drive the movable unit, and an urging unit configured to urge the movable unit to the fixed unit via the rolling members. The urging unit includes a magnet and a magnetic body. One of the magnet and the magnetic body is held by the movable unit, and another of the magnet and the magnetic body is held by the fixed unit. A range, in which the magnet can move when the actuator is driven to move the movable unit, does not protrude from an end of the magnetic body when viewed from a direction orthogonal to the plane.

20 Claims, 13 Drawing Sheets

(51) Int. Cl.
    *H01F 7/08*      (2006.01)
    *G02B 27/64*     (2006.01)
    *H04N 23/50*     (2023.01)
(52) U.S. Cl.
    CPC .............. *H01F 7/081* (2013.01); *H04N 23/50* (2023.01); *H04N 23/6812* (2023.01); *G03B 2205/0015* (2013.01); *G03B 2205/0069* (2013.01)
(58) Field of Classification Search
    CPC ................... G02B 27/646; G03B 5/02; G03B 2205/00–0015; G03B 2205/0038; G03B 2205/0053; G03B 2205/0069; G03B 2205/0084
    See application file for complete search history.

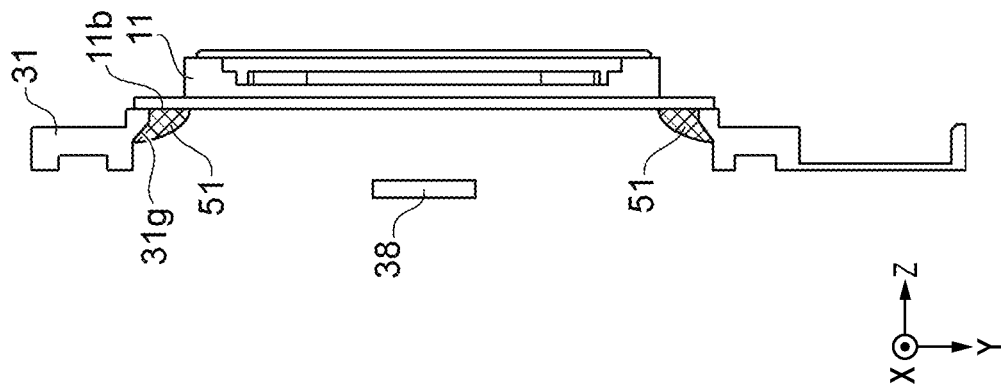
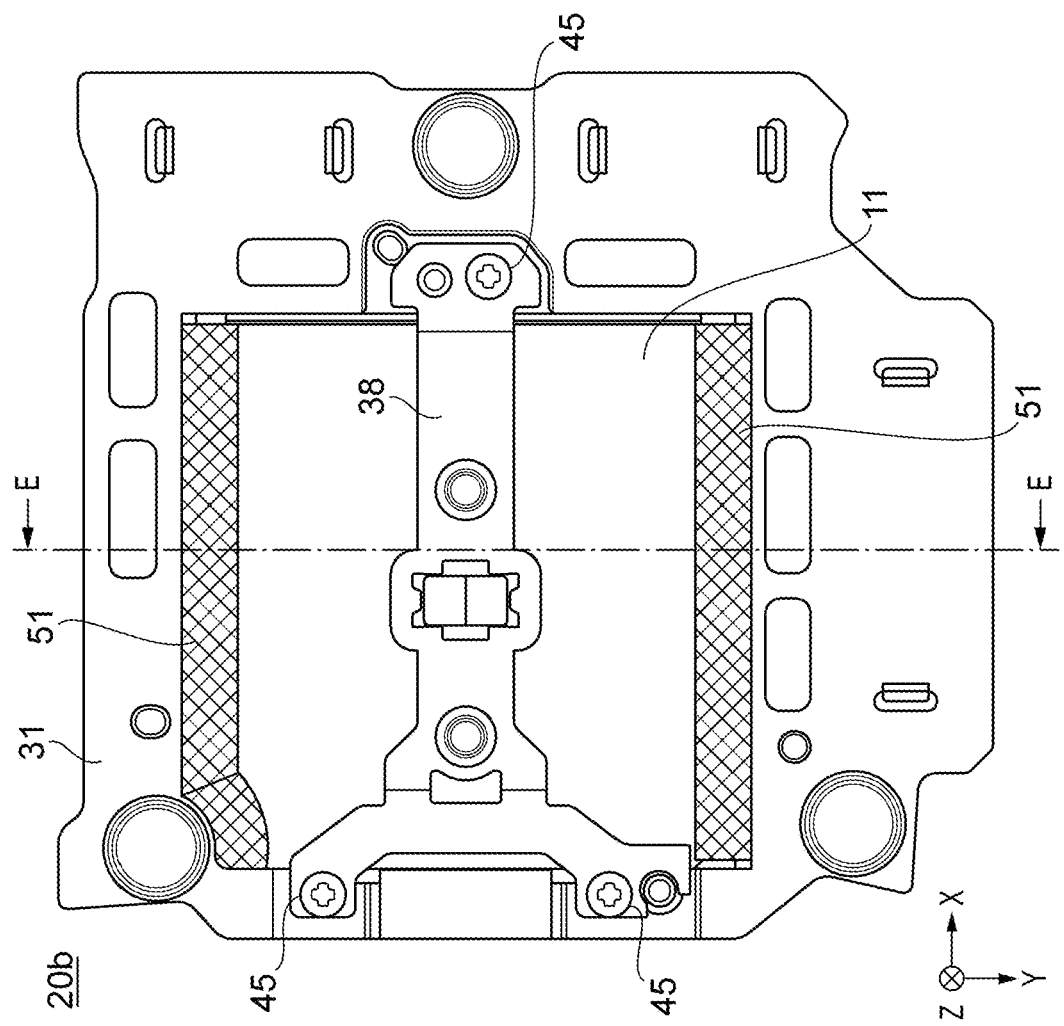

DRIVE DEVICE THAT DRIVES MOVABLE UNIT BY USING ACTUATOR, IMAGE BLUR CORRECTING DEVICE, IMAGE PICKUP APPARATUS, AND LENS BARREL

BACKGROUND OF THE INVENTION

Field of the Invention

The present invention relates to a drive device, an image blur correcting device, an image pickup apparatus, and a lens barrel, and more particularly to an image pickup apparatus and a lens barrel that are equipped with a drive device using a voice coil motor.

Description of the Related Art

Conventionally, a drive device for moving a movable unit in a plane with respect to a fixed unit has been known, and as a configuration for generating a driving force for driving the movable unit, there is a configuration called a voice coil motor (VCM) method.

In the VCM method, a magnet is disposed at one of the movable unit and the fixed unit, a coil is disposed at another of the movable unit and the fixed unit, and the driving force is generated by energizing the coil in a magnetic circuit that is formed by the magnet. For example, one of application examples of such a drive device is an image blur correcting mechanism that is mounted on an image pickup apparatus. In the image blur correcting mechanism, an image pickup element (an image sensor) or an image blur correction lens is mounted on the movable unit, and based on a camera shake amount that is detected by a predetermined sensor, the movable unit is driven so as to cancel out an image blur.

In the image blur correcting mechanism that adopts the VCM method, usually, by rollably disposing a plurality of balls between the movable unit and the fixed unit, it becomes possible to reduce a contact resistance and perform a smooth driving. In this case, as a method of sandwiching the balls between the movable unit and the fixed unit so that the balls are surely in contact with the movable unit and the fixed unit, a method, which pulls the movable unit and the fixed unit close to each other by using a spring and a magnet, is used (see Japanese Patent No. 6511495 and Japanese Patent No. 6719056).

For example, in the case of performing photographing by using the image pickup apparatus while walking, since the camera shake amount becomes large, there is a demand for an image blur correcting device capable of cancelling out such a large camera shake amount. By increasing a moving amount of the movable unit with respect to the fixed unit, it is possible for the image blur correcting device of the image pickup apparatus to correct a larger camera shake amount.

In order to solve such a problem, techniques described in Japanese Patent No. 6511495 and Japanese Patent No. 6719056 have such a configuration, that is, although a magnet and a magnetic body are used as a means for pulling the movable unit and the fixed unit close to each other, as the moving amount (a moving distance) increases, a returning force to return to the center due to a magnetic force occurs. This returning force can quickly perform returning to a state that an image blur correction is not performed, and on the other hand, there is a problem that this returning force increases a driving load when performing the image blur correction.

SUMMARY OF THE INVENTION

The present invention provides a drive device that reduces a returning force to return to the center when moving a movable unit with respect to a fixed unit and suppresses a load of an actuator driving the movable unit, an image blur correcting device, an image pickup apparatus, and a lens barrel.

Accordingly, the present invention provides a drive device comprising a fixed unit, a movable unit that is disposed so as to be capable of relatively moving in a predetermined range within a plane with respect to the fixed unit, a plurality of rolling members that are disposed between the fixed unit and the movable unit, an actuator configured to drive the movable unit, and an urging unit configured to urge the movable unit to the fixed unit via the rolling members, wherein the urging unit includes a magnet and a magnetic body, wherein one of the magnet and the magnetic body is held by the movable unit, and another of the magnet and the magnetic body is held by the fixed unit, and wherein a range, in which the magnet can move when the actuator is driven to move the movable unit, does not protrude from an end of the magnetic body when viewed from a direction orthogonal to the plane.

According to the present invention, it is possible to reduce the returning force to return to the center when moving the movable unit with respect to the fixed unit and suppresses the load of the actuator driving the movable unit.

Further features of the present invention will become apparent from the following description of exemplary embodiments with reference to the attached drawings.

BRIEF DESCRIPTION OF THE DRAWINGS

FIG. 10A is a front view of the movable unit that constitutes the first image blur correction unit, and FIG. 10B is a cross-sectional view of the movable unit that constitutes the first image blur correction unit.

DESCRIPTION OF THE EMBODIMENTS

The present invention will now be described in detail below with reference to the accompanying drawings showing embodiments thereof.

Here, although a configuration, in which a drive device according to the present invention is applied to an image blur correcting device of an image pickup apparatus, will be described as one of application examples of the drive device according to the present invention, the application examples of the drive device according to the present invention are not limited to the image pickup apparatus.

Figure 1:
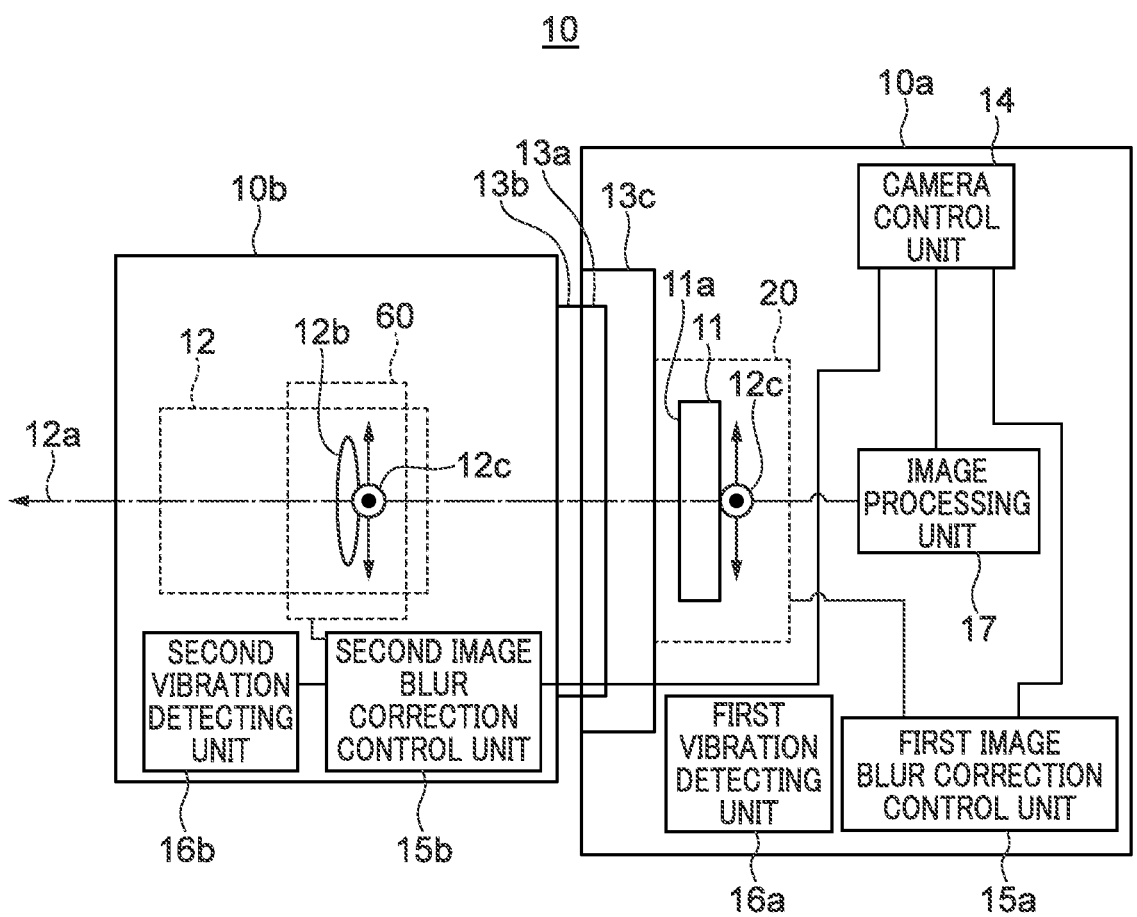
FIG. 1 is a diagram that shows a schematic configuration of an image pickup apparatus according to an embodiment of the present invention.

FIG. 1 is a diagram that shows a schematic configuration of an image pickup apparatus 10 according to an embodiment of the present invention. The image pickup apparatus 10 is a so-called mirrorless single-lens reflex digital camera (i.e., Mirrorless Interchangeable Lens Digital Camera), and has an image pickup apparatus main body 10a (hereinafter simply referred to as "a main body 10a") and a lens barrel 10b that can be attached/detached to/from the main body 10a.

The main body 10a includes an image pickup element (an image sensor) 11 that has an image pickup plane 11a, a base member 13c, a main body side mount member 13a, a camera control unit 14, a first image blur correction control unit 15a, a first vibration detecting unit 16a, an image processing unit 17, and a first image blur correction unit 20. Further, the lens barrel 10b includes an image pickup optical system 12 that includes an image blur correction lens 12b, a lens side mount member 13b, a second image blur correction control unit 15b, a second vibration detecting unit 16b, and a second image blur correction unit 60.

A virtual light ray, which becomes the representative for a light flux irradiated to the image pickup plane 11a of the image pickup element 11 via the image pickup optical system 12 is referred to as "an image pickup optical axis 12a" (hereinafter simply referred to as "an optical axis 12a"). Further, a plane that is orthogonal to the optical axis 12a is referred to as "an optical axis orthogonal plane" (hereinafter referred to as "an optical axis orthogonal plane 12c"). The optical axis 12a passes through the center of the image pickup plane 11a and is orthogonal to the image pickup plane 11a. Further, in order to clarify the arrangement and positional relation within the image pickup apparatus 10 of each part (each configuration element) constituting the image pickup apparatus 10, a X direction, a Y direction, and a Z direction that are orthogonal to each other are defined as shown in FIG. 1. The Z direction is a direction parallel to the optical axis 12a, the X direction is a width direction of the image pickup apparatus 10, and the Y direction is a height direction of the image pickup apparatus 10. In the case that both the X direction and the Z direction are within a horizontal plane, the Y direction becomes a vertical direction. Therefore, the optical axis orthogonal plane 12c becomes an X-Y plane.

The image pickup element 11 is configured by a photoelectric conversion element such as a CMOS (Complementary Metal Oxide Semiconductor) image sensor or a CCD (Charge Coupled Device) image sensor, and is disposed so that the image pickup plane 11a faces a subject side (the lens barrel 10b side) and the image pickup plane 11a is orthogonal to the optical axis 12a. The image pickup element 11 generates image signals by performing a photoelectric conversion with respect to an optical image of a subject, which is formed on the image pickup plane 11a by the image pickup optical system 12. The image signals generated by the image pickup element 11 are converted into image data by the image processing unit 17 performing various kinds of processing, and the image data is stored in a memory (a storage device) (not shown). The camera control unit 14 is a calculating means within a main IC (integrated circuit) (not shown), accepts input operations from a user via an operating means (not shown), and controls the overall operation of the image pickup apparatus 10.

The image pickup optical system 12 is configured by a lens group (not shown) disposed inside the lens barrel 10b, and forms the optical image of reflected light from the subject (not shown) on the image pickup plane 11a of the image pickup element 11. In the image pickup apparatus 10, in order to dispose the image pickup element 11 with respect to the optical axis 12a with a high positional accuracy, the image pickup element 11 is attached to the base member 13c that is provided in the main body 10a, and the lens barrel 10b is also connected to the base member 13c. In this case, the image pickup element 11 is attached to the base member 13c via the first image blur correction unit 20. Further, the lens barrel 10b is connected to the base member 13c via the lens side mount member 13b and the main body side mount member 13a.

The first image blur correction unit 20 corrects an image blur caused by a camera shake that occurred in the image pickup apparatus 10 by moving the image pickup element 11 in an optical axis orthogonal direction or rotating the image pickup element 11 within the optical axis orthogonal plane 12c, and makes it possible to obtain a clear subject image. Specifically, when a posture of the image pickup apparatus 10 changes with respect to the subject during image pickup, since an image formation position of the subject light flux on the image pickup plane 11a of the image pickup element 11 changes, the image obtained through the image pickup element 11 is blurred. At that time, in the case that a change in the posture of the image pickup apparatus 10 is sufficiently small, the change in the image formation position is uniform within the image pickup plane 11a, and can be regarded as a translational or rotational movement (an image plane blur) within the optical axis orthogonal plane 12c. Therefore, by translationally or rotationally moving the image pickup element 11 within the optical axis orthogonal plane 12c so as to cancel out the image plane blur, it is possible to obtain the clear subject image, in which the image blur is corrected. Moreover, the first image blur correction unit 20 may be configured to also move the image pickup element 11 in a direction orthogonal to the image pickup plane when moving the image pickup element 11 in a direction parallel to the image pickup plane.

Similarly, the second image blur correction unit 60 corrects the image blur caused by the camera shake that occurred in the image pickup apparatus 10 by moving the image blur correction lens 12b in the optical axis orthogonal direction or rotating the image blur correction lens 12b within the optical axis orthogonal plane 12c, and makes it possible to obtain the clear subject image. That is, the optical axis 12a is refracted by moving the image blur correction lens 12b in the optical axis orthogonal direction. At this time, the image blur correction lens 12b is moved in the optical axis orthogonal direction so that the image plane blur is canceled out. As a result, it is possible to obtain the clear subject image, in which the image blur is corrected. Moreover, since the principle of image blur correction that is performed by moving the image pickup element 11 or the image blur correction lens 12b is publicly known, a more detailed description will be omitted. Further, the second image blur correction unit 60 may be configured to also move the image blur correction lens 12b in an optical axis direction when moving the image blur correction lens 12b in the optical axis orthogonal direction.

The first image blur correction unit 20 schematically has a fixed unit, a movable unit, and a plurality of driving force generating units. The fixed unit is fixed to the base member 13c, and the movable unit holds the image pickup element 11. Further, the movable unit is supported with three degrees of freedom by the fixed unit, and can relatively move in the optical axis orthogonal direction and rotate within the optical axis orthogonal plane 12c with respect to the fixed portion. That is, the first image blur correction unit 20 is configured as a drive device (a so-called X-Y-θ stage) capable of performing a triaxial drive control, and can move the image pickup element 11 in the optical axis orthogonal direction and rotate the image pickup element 11 within the optical axis orthogonal plane 12c.

The second image blur correction unit 60 schematically has a fixed unit, a movable unit, and a plurality of driving force generating units. The fixed unit is fixed to a housing (not shown) of the lens barrel 10b, and the movable unit holds the image blur correction lens 12b. Further, the movable unit is supported with two degrees of freedom by the fixed unit, and can relatively move in the optical axis orthogonal direction with respect to the fixed portion. That is, the second image blur correction unit 60 is configured as a drive device (a so-called X-Y stage) capable of performing a biaxial drive control, and can move the image blur correction lens 12b in the optical axis orthogonal direction.

The first vibration detecting unit 16a and the second vibration detecting unit 16b are configured by a gyro sensor, an acceleration sensor, or the like, respectively, and are camera shake detecting means that detect an angular velocity, an acceleration, and the like in each direction of the image pickup apparatus 10 as camera shake information of the image pickup apparatus 10. The first image blur correction control unit 15a and the second image blur correction control unit 15b integrate the angular velocity and the acceleration that are detected by the first vibration detecting unit 16a and the second vibration detecting unit 16b, respectively, so as to calculate an angle change amount and a moving amount in each direction of the image pickup apparatus 10 as the camera shake information. That is, the first vibration detecting unit 16a, the second vibration detecting unit 16b, the first image blur correction control unit 15a, and the second image blur correction control unit 15b function as a first detecting unit that detects camera shake information of the fixed unit. Further, the first image blur correction control unit 15a calculates a moving target value of the image pickup element 11 based on the camera shake information detected by the first vibration detecting unit 16a, and controls driving of the first image blur correction unit 20 so as to control moving of the image pickup element 11. Similarly, the second image blur correction control unit 15b calculates a moving target value of the image blur correction lens 12b based on the camera shake information detected by the second vibration detecting unit 16b, and controls driving of second image blur correction unit 60 so as to control moving of the image blur correction lens 12b.

Moreover, the image pickup apparatus 10 may be configured to include only one of the first image blur correction unit 20 and the second image blur correction unit 60. In the case that the image pickup apparatus 10 does not include the first image blur correction unit 20, the image pickup element 11 is fixedly disposed with respect to the optical axis 12a. Further, in the case that the image pickup apparatus 10 does not include the second image blur correction unit 60, the image blur correction lens 12b is basically unnecessary. That is, the image pickup optical system 12 of the lens barrel 10b is designed so that desired optical characteristics can be obtained by means of a lens configuration that does not include the image blur correction lens 12b.

Next, the detailed configuration of the first image blur correction unit 20 will be described. Further, since the configuration of the second image blur correction unit 60 is similar to the configuration of the first image blur correction unit 20, the description thereof will be omitted.

Figure 2:
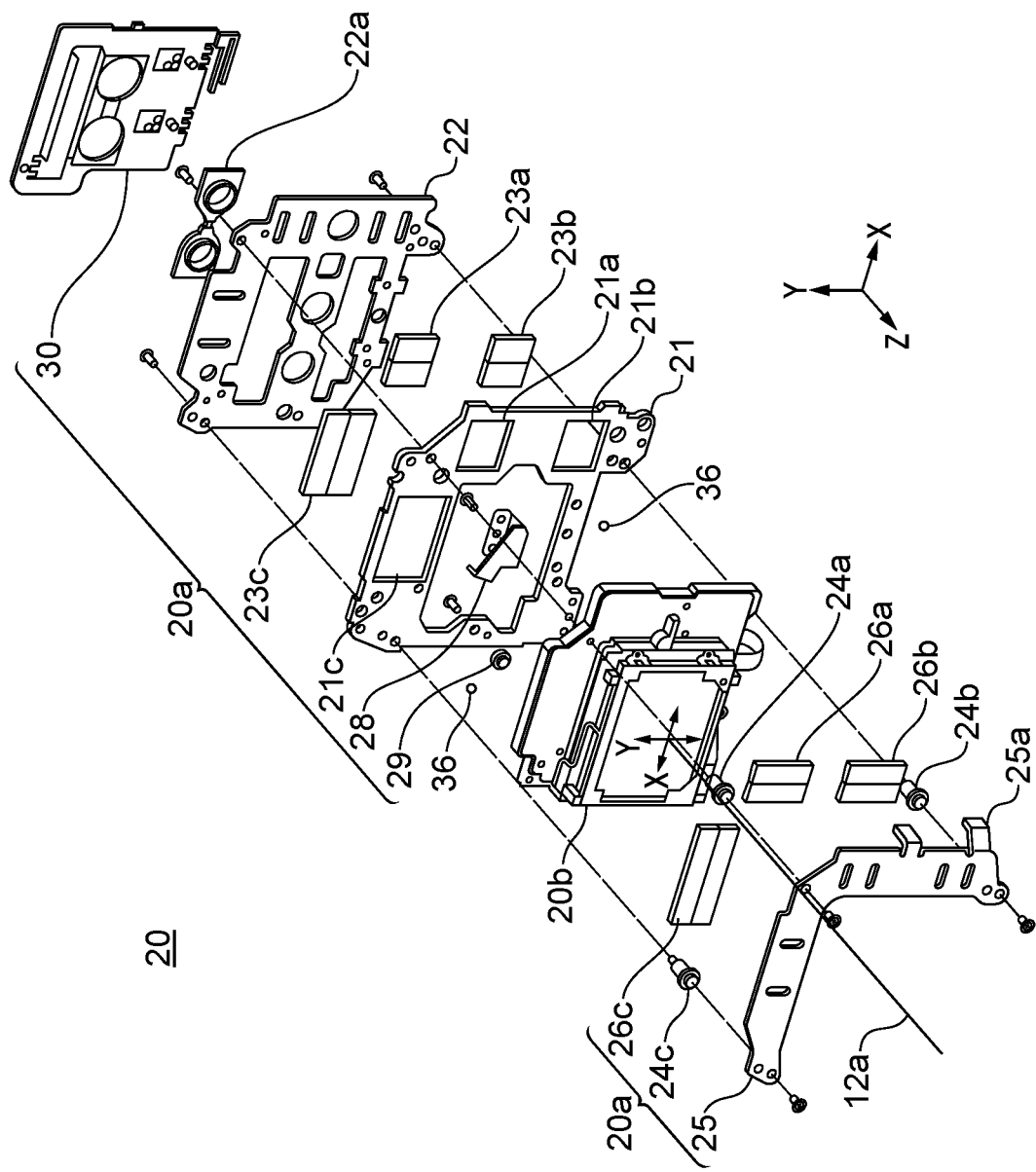
FIG. 2 is an exploded perspective view of a first image blur correction unit that is equipped in the image pickup apparatus.
Figure 3:
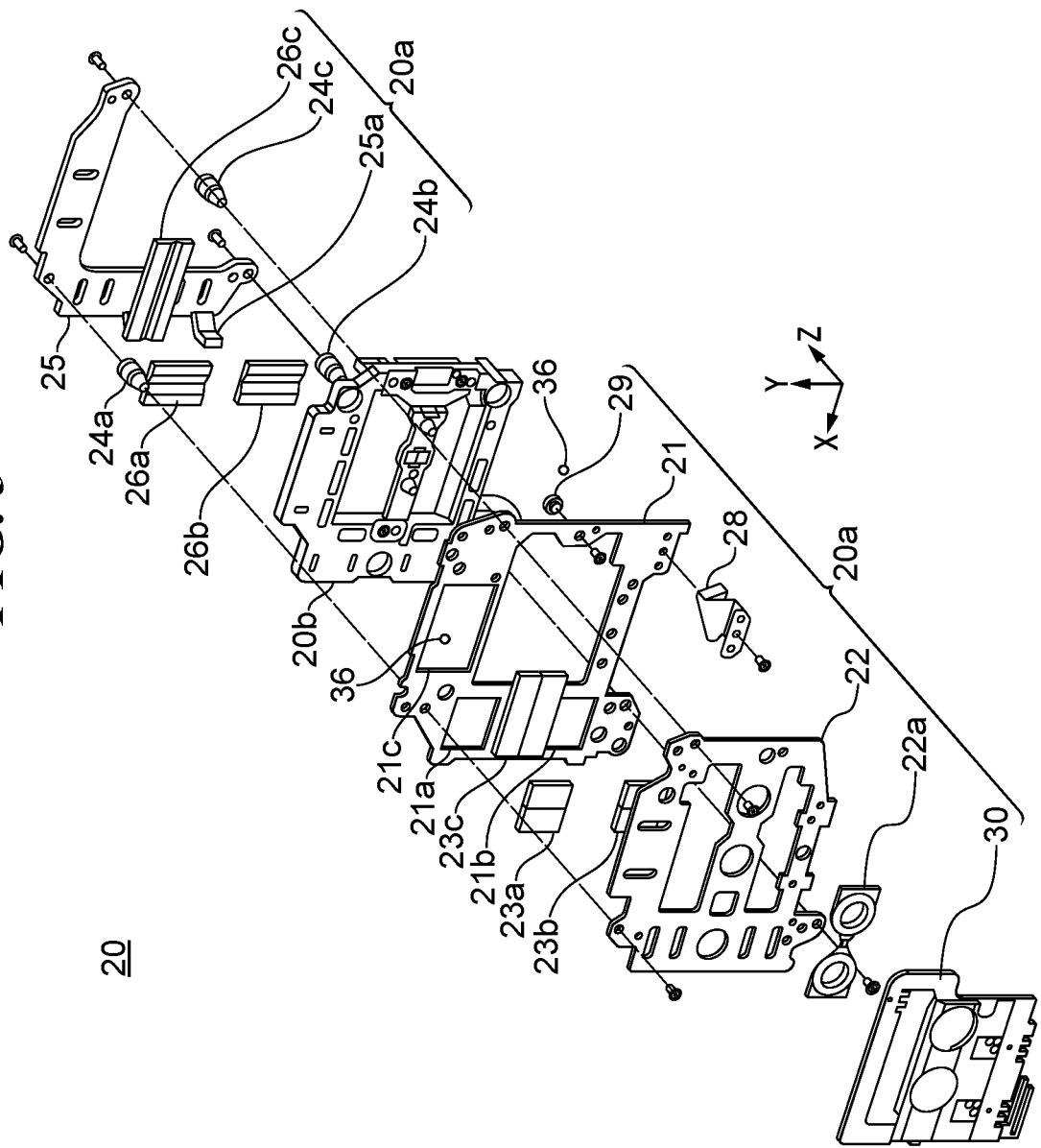
FIG. 3 is another exploded perspective view of the first image blur correction unit that is equipped in the image pickup apparatus.

FIG. 2 and FIG. 3 are exploded perspective views of the first image blur correction unit 20, and a direction for viewing the first image blur correction unit 20 in FIG. 2 is different from a direction for viewing the first image blur correction unit 20 in FIG. 3. The first image blur correction unit 20 includes a fixed unit 20a and a movable unit 20b (a movable member). In addition, in FIG. 2 and FIG. 3, the movable unit 20b is represented without being disassembled, and the fixed unit 20a is represented as being disassembled.

The fixed unit 20a has a fixed member 21, a rear yoke 22, a first rear magnet group 23a, a second rear magnet group 23b, and a third rear magnet group 23c. The fixed member 21 is provided with a first opening 21a, a second opening 21b, and a third opening 21c. The first rear magnet group 23a, the second rear magnet group 23b, and the third rear magnet group 23c are fixed to the rear yoke 22 by means of a bonding agent or the like, respectively, and are disposed so as to be surrounded by the first opening 21a, the second opening 21b, and the third opening 21c.

In the present embodiment, as the first rear magnet group 23a, the second rear magnet group 23b, and the third rear magnet group 23c, two magnets, which are arranged side by side so that the two magnets magnetized in the optical axis direction (the Z direction) generate magnetic fields, which inverse in direction to each other, are used, respectively. However, the first rear magnet group 23a, the second rear magnet group 23b, and the third rear magnet group 23c are not limited to such the two magnets, and may be use one magnet magnetized in two poles.

The fixed unit 20a also has a first column member 24a, a second column member 24b, a third column member 24c, a front yoke 25, a first front magnet 26a, a second front magnet 26b, and a third front magnet 26c. The front yoke 25 is fixed to the fixed member 21 by means of screws via the first column member 24a, the second column member 24b, and the third column member 24c. The first front magnet 26a, the second front magnet 26b, and the third front magnet 26c are fixed to the front yoke 25 by means of the bonding agent or the like, respectively.

In the present embodiment, as the first front magnet 26a, the second front magnet 26b, and the third front magnet 26c, one magnet magnetized in two poles is used, respectively. However, the first front magnet 26a, the second front magnet 26b, and the third front magnet 26c are not limited to such the one magnet, and may be use two magnets, which are arranged side by side so that the two magnets magnetized in the optical axis direction generate magnetic fields, which inverse in direction to each other.

The first rear magnet group 23a and the first front magnet 26a, which are arranged side by side in the optical axis direction, form a first magnetic circuit. Similarly, the second rear magnet group 23b and the second front magnet 26b form a second magnetic circuit, and the third rear magnet group 23c and the third front magnet 26c form a third magnetic circuit.

The fixed unit 20a further has a first regulating member 28, a second regulating member 29, and a cover 30. The rear yoke 22 has a first regulating portion 22a, and the front yoke 25 has a second regulating portion 25a. Moving of the movable unit 20b is regulated within a predetermined range within the optical axis orthogonal plane 12c by the first regulating member 28, the second regulating member 29, the first regulating portion 22a, the second regulating portion 25a, the first column member 24a, the second column member 24b, and the third column member 24c. Cushioning materials such as rubber, which absorb impacts at the time of abutting, are provided at abutting portions of these members and portions, which regulate the moving of the movable unit 20b, so as to avoid damage and reduce impact noises. The cover 30 prevents contact between the rear yoke 22 and a flexible printed circuit board such as a drive FPC (Flexible Printed Circuits) 35, which will be described later.

Figure 4:
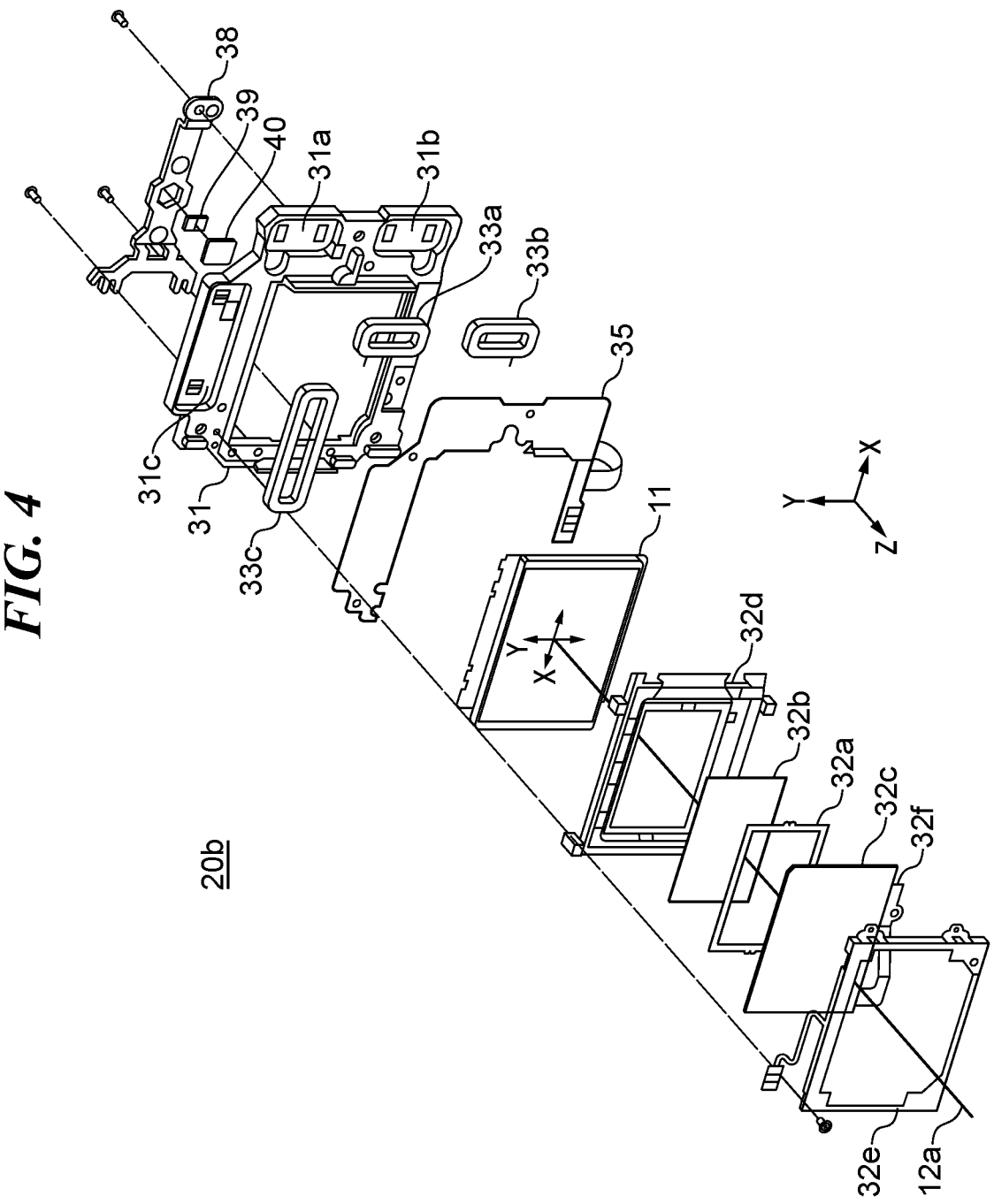
FIG. 4 is an exploded perspective view of a movable unit that constitutes the first image blur correction unit.
Figure 5:
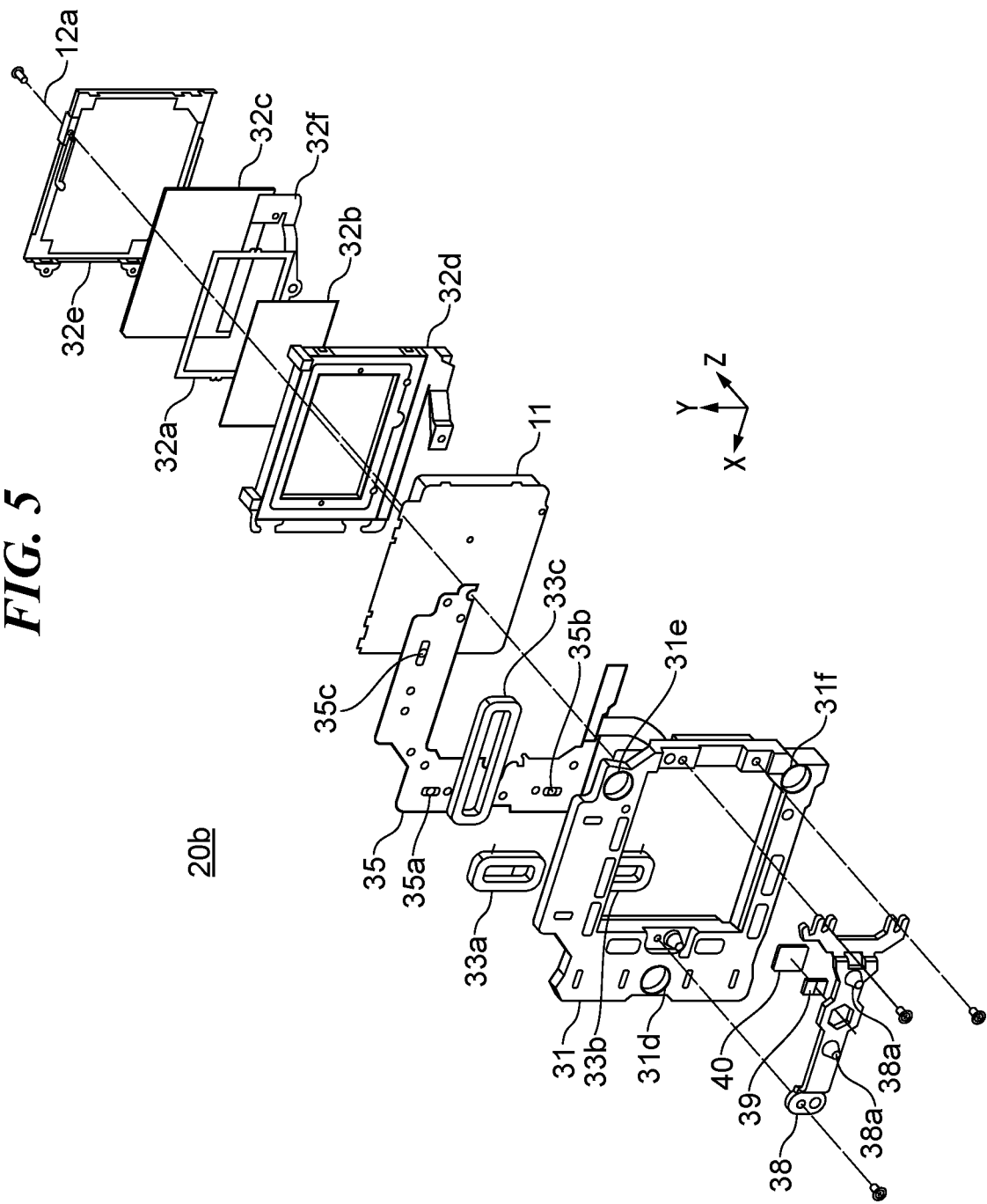
FIG. 5 is another exploded perspective view of the movable unit that constitutes the first image blur correction unit.

FIG. 4 and FIG. 5 are exploded perspective views of the movable unit 20b, and a direction for viewing the movable unit 20b in FIG. 4 is different from a direction for viewing the movable unit 20b in FIG. 5. The movable unit 20b has an image pickup element holding member 31 and the image pickup element 11. The image pickup element 11 is fixed to the image pickup element holding member 31 by means of the bonding agent or the like, and the details thereof will be described later. Further, the movable unit 20b has a mask 32a, an infrared absorption filter 32b, an optical low-pass filter 32c, and a vibrating unit 32f. The mask 32a, the infrared absorption filter 32b, and the optical low-pass filter 32c are held by a holder member 32d and a holder sheet metal 32e, and are fixed to the image pickup element 11 by an adhesive member or the like. The mask 32a prevents unnecessary light from outside a photographic optical path from entering the image pickup element 11. The optical low-pass filter 32c reduces moire that is caused by a repeating pattern of the subject. The vibrating unit 32f is provided in the optical low-pass filter 32c, and removes foreign matter such as dust adhering to the surface of the optical low-pass filter 32c by vibrating the optical low-pass filter 32c. Moreover, since the principle and control of removing the foreign matter by the vibrating unit 32f are publicly known, detailed description thereof will be omitted.

The movable unit 20b further includes a first coil 33a, a second coil 33b, a third coil 33c, and the drive FPC 35. The drive FPC 35 is disposed so as to overlap the first coil 33a, the second coil 33b, and the third coil 33c on an optical axis projection plane (i.e., on the X-Y plane when viewed from the Z direction), and is fixed to the image pickup element holding member 31 by means of the bonding agent or the like.

The image pickup element holding member 31 has a first concave portion 31a, a second concave portion 31b, and a third concave portion 31c. The first coil 33a is disposed inside the first concave portion 31a, the second coil 33b is disposed inside the second concave portion 31b, the third coil 33c is disposed inside the third concave portion 31c, and the first coil 33a, the second coil 33b, and the third coil 33c are fixed to the image pickup element holding member 31 by means of the bonding agent or the like.

The first magnetic circuit and the first coil 33a form a VCM as a first actuator, the second magnetic circuit and the second coil 33b form a VCM as a second actuator, and the third magnetic circuit and the third coil 33c form a VCM as a third actuator. Lorentz force is generated in a direction that is orthogonal to a magnetic field generated in the optical axis direction in the first magnetic circuit and a current flowing in the first coil 33a, and a resultant force direction of the Lorentz force changes according to an energizing direction of the first coil 33a. Similar Lorentz forces are generated in the second magnetic circuit and the second coil 33b, and also in the third magnetic circuit and the third coil 33c. The first actuator and the second actuator generate respective forces (respective driving forces) that are substantially parallel to the X direction, a translational force in the X direction is generated by the sum of the respective forces, and a rotational force around the optical axis is generated by the difference between the respective forces. The third actuator generates a translational force in the Y direction.

A first detector 35a, a second detector 35b, and a third detector 35c are attached to the drive FPC 35. The first detector 35a is disposed inside the first coil 33a, the second detector 35b is disposed inside the second coil 33b, and the third detector 35c is disposed inside the third coil 33c. The first detector 35a, the second detector 35b, and the third detector 35c are, for example, Hall elements. The first detector 35a detects a magnetic force of the first magnetic circuit. Based on a detection result of the first detector 35a, the first image blur correction control unit 15a calculates position information (specifically, a position and an angle around the optical axis) within the optical axis orthogonal plane 12c of the movable unit 20b with respect to the fixed unit 20a. The same applies to the second detector 35b and the third detector 35c. That is, the first detector 35a, the second detector 35b, the third detector 35c, and the first image blur correction control unit 15a function as a second detecting unit that detects relative position information of the movable unit with respect to the fixed unit. The first coil 33a, the second coil 33b, and the third coil 33c are electrically connected to the drive FPC35, and the first image blur correction control unit 15a controls the current flowing through each coil via the drive FPC35. That is, the first image blur correction control unit 15a, which functions as a control unit, controls driving of the movable unit 20b by a feedback control based on a deviation between the moving target value of the image pickup element 11 based on the camera shake information detected by the first vibration detecting unit 16a and a current position of the image pickup element 11 detected by the Hall element.

The movable unit 20b is urged to the fixed member 21 constituting the fixed unit 20a by an attractive force, which is generated between the rear yoke 22 and a thrust magnet 39 by a magnetic force of the thrust magnet 39, via balls 36 (see FIG. 2 and FIG. 3) that are rolling members. In other words, the rear yoke 22 and the thrust magnet 39 constitutes an urging unit that urges the movable unit 20b to the fixed unit 20a. Moreover, in order to generate the attractive force between the rear yoke 22 and the thrust magnet 39, the rear yoke 22 needs to be a magnetic body (a member made of a magnetic material). The details of the urging unit will be described later.

The balls 36 are disposed inside a first enclosure portion 31d, inside a second enclosure portion 31e, and inside a third enclosure portion 31f that are provided on the image pickup element holding member 31, respectively. Since the balls 36 roll when the movable unit 20b moves within the optical axis orthogonal plane 12c with respect to the fixed unit 20a, a load due to friction between the balls, and the image pickup element holding member 31 and the fixed member 21 hardly occurs. Further, the moving of the movable unit 20b toward a direction opposite to a direction, in which the urging unit configured by the rear yoke 22 and the thrust magnet 39 urges the movable unit 20b, is regulated by the front yoke 25 and the first regulating member 28. Therefore, even if an impact is applied to the image pickup apparatus 10 and an external force such as pulling the movable unit 20b away from the fixed member 21 is applied, the movable unit 20b does not fall off from the fixed unit 20a.

The movable unit 20b includes a connecting member 38, and the connecting member 38 is bridged to an opening 31i of the image pickup element holding member 31 and is fixed to the image pickup element holding member 31 by means of screws 45 on both sides of the optical axis. Abutting portions 38a are provided in two positions of the connecting member 38, and when the abutting portions 38a abut on the first regulating portion 22a of the rear yoke 22, the moving of the movable unit 20b within the optical axis orthogonal plane 12c is regulated to a certain range.

The thrust magnet 39 and a thrust yoke 40 are fixed to the connecting member 38 by means of the bonding agent or the like, and the thrust magnet 39 is magnetized in the optical axis direction. Moreover, as the thrust magnet 39, one magnet magnetized in two poles so that magnetic fields in different directions are arranged in the Y direction can be used, but one magnet magnetized in a single pole can also be used.

The urging unit configured by the rear yoke 22 and the thrust magnet 39 is disposed inside a triangle formed by three balls 36, which are disposed inside the first enclosure portion 31d, inside the second enclosure portion 31e, and inside the third enclosure portion 31f, respectively. As a result, a well-balanced urging force can be generated for each ball 36.

Figure 6A:
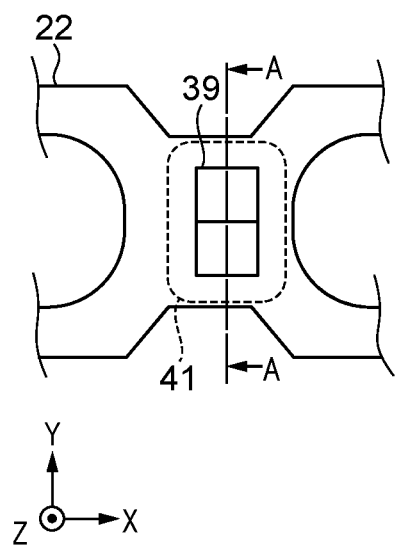
FIG. 6A is a first projection view in an optical axis direction of an urging unit configured by a rear yoke and a thrust magnet.
Figure 6B:
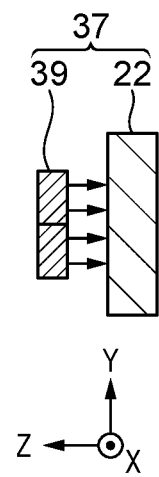
FIG. 6B is a first cross-sectional view of the urging unit configured by the rear yoke and the thrust magnet.
Figure 7A:
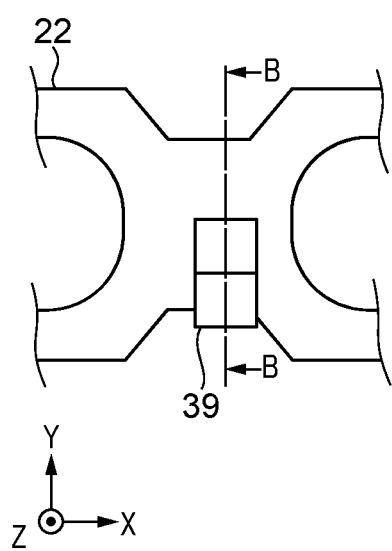
FIG. 7A is a second projection view in the optical axis direction of the urging unit configured by the rear yoke and the thrust magnet.
Figure 7B:
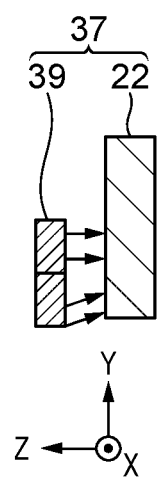
FIG. 7B is a second cross-sectional view of the urging unit configured by the rear yoke and the thrust magnet.

Next, the urging unit configured by the rear yoke 22 and the thrust magnet 39 will be described in detail. FIG. 6A and FIG. 7A are projection views of the urging unit configured by the rear yoke 22 and the thrust magnet 39 when viewed from the subject side in the optical axis direction, respectively. Specifically, FIG. 6A represents one example of a state, in which the movable unit 20b is within an image stabilization control range of the first image blur correction unit 20 by the first image blur correction control unit 15a, by a position of the thrust magnet 39 with respect to the rear yoke 22. On the other hand, FIG. 7A represents one example of a state, in which the movable unit 20b protrudes outside the image stabilization control range of the first image blur correction unit 20 by the first image blur correction control unit 15a, by the position of the thrust magnet 39 with respect to the rear yoke 22. FIG. 6B is a cross-sectional view taken along arrows A to A shown in FIG. 6A. Further, FIG. 7B is a cross-sectional view taken along arrows B to B shown in FIG. 7A.

Since the thrust magnet 39 is fixed to the connecting member 38 constituting the movable unit 20b, the thrust magnet 39 relatively moves with respect to the rear yoke 22 accompanied with the moving of the movable unit 20b. In FIG. 6A, a region (a range), in which the thrust magnet 39 can move according to the image stabilization control range of the first image blur correction unit 20, is represented by a broken line as a movable region 41.

As shown in FIG. 6A and FIG. 6B, the movable region 41 of the thrust magnet 39 does not protrude from an end surface of the rear yoke 22 on the optical axis projection plane. Therefore, the urging force by the urging unit acts only in the optical axis direction and does not act in a direction orthogonal to the optical axis 12a, and as a result, the urging unit does not lower image stabilization controllability of the first image blur correction unit 20 (that is, drive controllability of the movable unit 20b). Further, as shown in FIG. 7B, in the case that the thrust magnet 39 protrudes from the end of the rear yoke 22 on the optical axis projection plane, although a part of the urging force by the urging unit acts in the direction orthogonal to the optical axis 12a, since it is out of the image stabilization control range, it does not affect the drive controllability of the movable unit 20b.

As described above, in the case that a moving amount of the movable unit 20b from a reference position of the movable unit 20b with respect to the rear yoke 22 is larger than a predetermined value, a part of the attractive force generated between the thrust magnet 39 and the rear yoke 22 acts as a force in a direction of returning the movable unit 20b to the reference position. On the other hand, in the case that the moving amount of the movable unit 20b from the reference position of the movable unit 20b with respect to the rear yoke 22 is not larger than the predetermined value, the attractive force generated between the thrust magnet 39 and the rear yoke 22 does not act as the force in the direction of returning the movable unit 20b to the reference position.

Figure 8A:
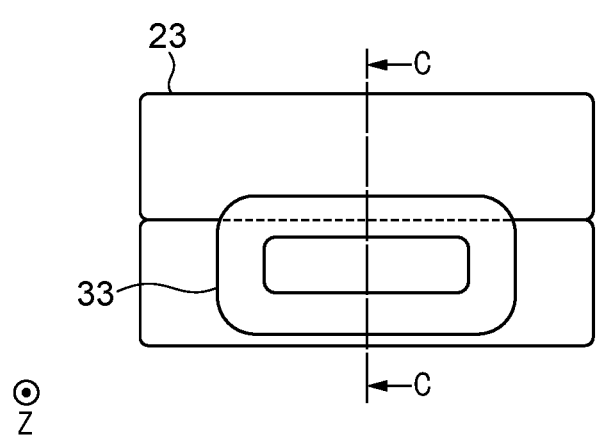
FIG. 8A and FIG. 8C are projection views in the optical axis direction of an actuator.
Figure 8B:
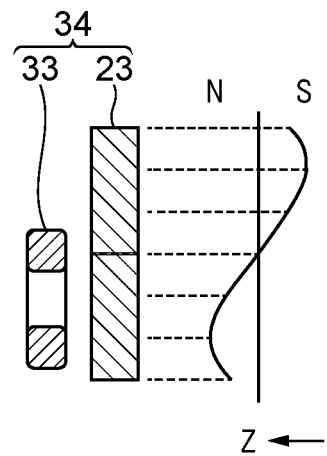
FIG. 8B and FIG. 8D are cross-sectional views of the actuator.
Figure 8C:
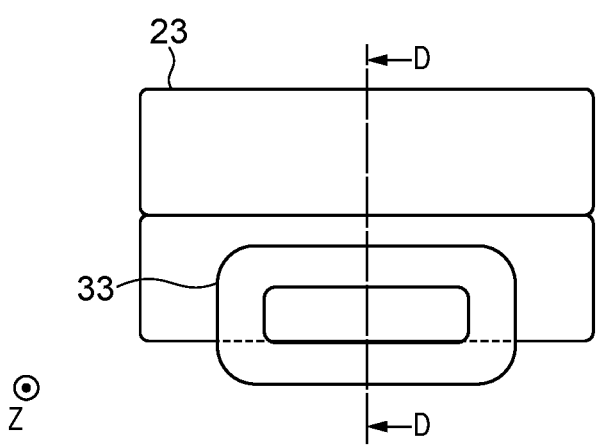
Figure 8D:
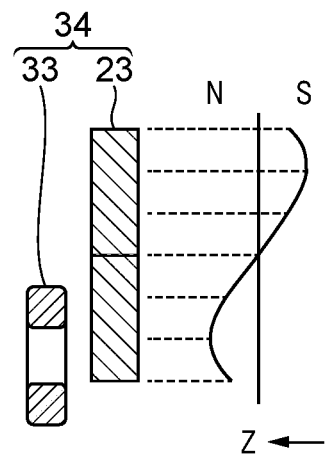

Subsequently, the driving forces of the first actuator, the second actuator, and the third actuator when the movable unit 20b moves significantly within the optical axis orthogonal plane 12c will be described. FIG. 8A and FIG. 8C are projection views of an actuator 34 when viewed from the subject side in the optical axis direction, respectively. FIG. 8B is a cross-sectional view taken along arrows C to C shown in FIG. 8A. Further, FIG. 8D is a cross-sectional view taken along arrows D to D shown in FIG. 8C.

Moreover, since the first and second actuators and the third actuator have different driving force generation directions but the same function, they are referred to as "the actuator 34". Similarly, since the first coil 33a, the second coil 33b, and the third coil 33c have the same function, they are referred to as "a coil 33". Further, the first rear magnet group 23a, the second rear magnet group 23b, and the third rear magnet group 23c, which are opposite to the first coil 33a, the second coil 33b, and the third coil 33c in the optical axis direction, are also referred to as "a magnet 23".

When the movable unit 20b relatively moves with respect to the fixed unit 20a, the coil 33 constituting the actuator 34 relatively moves with respect to the magnet 23. Therefore, when the movable unit 20b moves largely with respect to the fixed unit 20a, the coil 33 also moves relatively large with respect to the magnet 23.

In the state shown in FIG. 8A, the movable unit 20b moves within the optical axis orthogonal plane 12c to a position that one side of the coil 33 is opposite to a switching mb of magnetizing of the magnet 23. In the state shown in FIG. 8C, in which the movable unit 20b has moved further largely from the state of FIG. 8A, the one side of the coil 33 is not opposite to the magnet 23. In these cases, a returning force that the actuator 34 tries to return the movable unit 20b to an original position (a position that a camera shake correction amount becomes zero (the reference position)) decreases.

However, in the case that the movable unit 20b has moved significantly to the state shown in FIG. 7A and FIG. 7B, in which the thrust magnet 39 protrudes from the end of the rear yoke 22 within the optical axis orthogonal plane 12c, a component in the direction orthogonal to the optical axis 12a of the attractive force by the urging unit assists the returning force for returning the movable unit 20b to the original position. In this way, in the first image blur correction control unit 15a, it is possible to obtain a sufficiently large returning force for returning the movable unit 20*b* to the original position without requiring increasing the size of the actuator 34 or increasing the current flowing through the coil 33.

Figure 9:
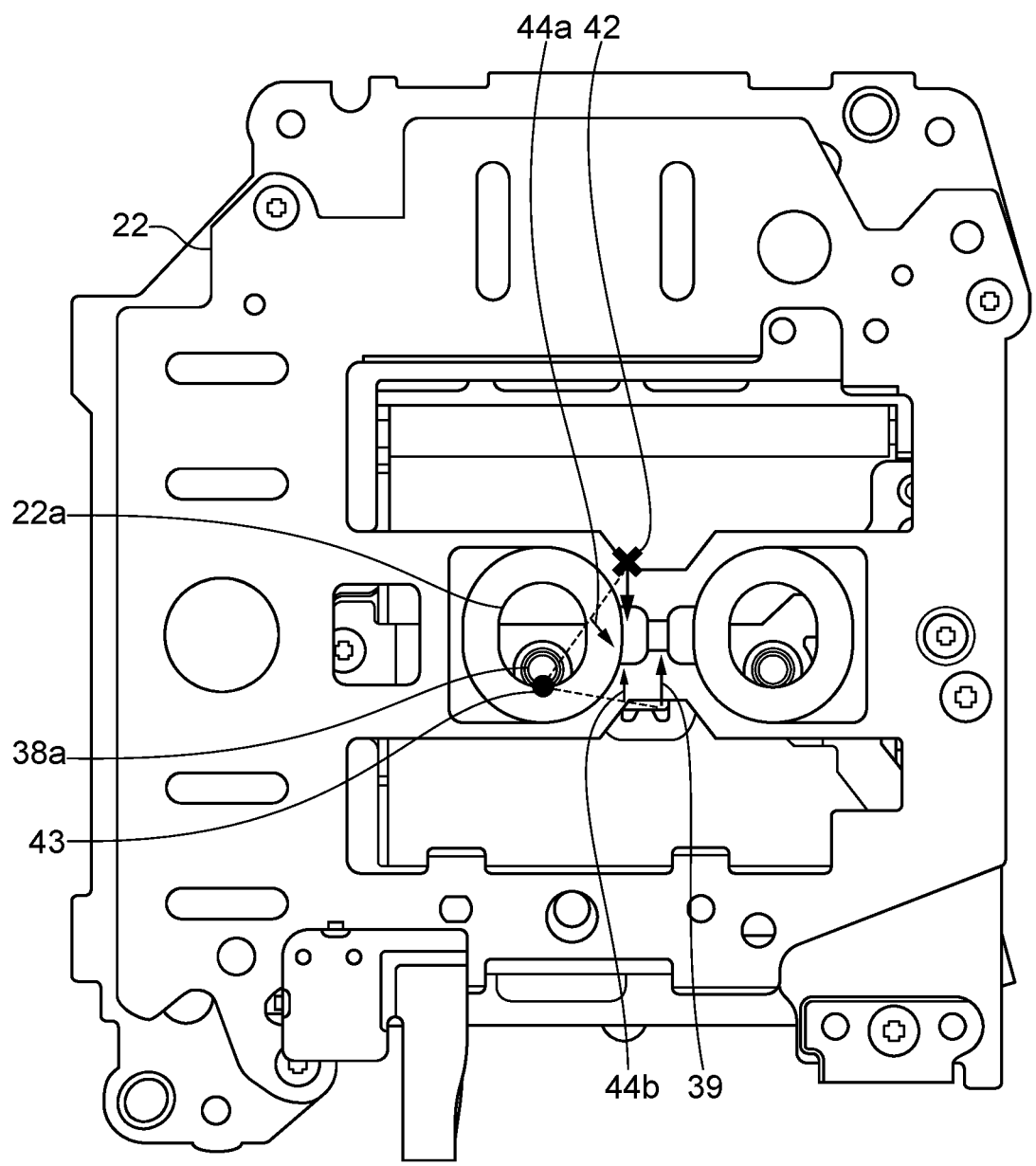
FIG. 9 is a projection view in the optical axis direction of the first image blur correction unit in a state that a power is not turned on in a main body of the image pickup apparatus.

Next, a relationship between the attractive force by the urging unit that assists a thrust (the driving force) of the actuator 34 when returning the movable unit 20*b* to the original position and a gravitational force will be described. FIG. 9 is a projection view of the first image blur correction unit 20 in a state that a power is not turned on in the main body 10*a* when viewed from the subject side in the optical axis direction. Moreover, in FIG. 9, the cover 30 equipped in the first image blur correction unit 20 is not shown.

In the state that the power of the image pickup apparatus 10, which also functions as an energizing unit for passing the current through the coil, is not turned on, the user generally places the image pickup apparatus 10 on a desk or the like so that the Y direction becomes the gravity direction (i.e., so that a Z-X plane becomes parallel to a horizontal direction). In this case, since the first coil 33*a*, the second coil 33*b*, and the third coil 33*c* are not energized, as shown in FIG. 9, the movable unit 20*b* moves in the Y direction due to the gravitational force.

As described above, the connecting member 38 of the movable unit 20*b* has two abutting portions 38*a*. Here, a position that one closer to a centroid 42 of the movable unit 20*b* among the two abutting portions 38*a* abuts on the first regulating portion 22*a* is defined as an abutting position 43. At this time, within the optical axis orthogonal plane 12*c*, a first moment 44*a* due to a gravitational force centered on the abutting position 43 and a second moment 44*b* due to the returning force of the urging unit are generated. Since the second moment 44*b* due to the returning force of the urging unit is smaller than the first moment 44*a* due to the gravitational force, due to a balance with the gravitational force, the movable unit 20*b* is held in a state that the two abutting portions 38*a* abut on the first regulating portion 22*a*. As a result, since the image pickup element 11 will not be tilted within the optical axis orthogonal plane 12*c*, the performance of the image pickup apparatus 10 will not be impaired.

Next, a structure, which bonds the image pickup element 11 to the image pickup element holding member 31 so as to hold the image pickup element 11, will be described below with reference to FIG. 10A, FIG. 10B, FIG. 11A, and FIG. 11B. In order to enhance the image quality of the image pickup apparatus 10, it is desirable to enhance the positional accuracy of the image pickup element 11. Further, in the case of considering the purpose of the image pickup apparatus 10, it is desirable to enhance impact resistance under various situations. In order to meet such demands, the image pickup element 11 is fixed to the image pickup element holding member 31 by a first bonded portion 51 described below with reference to FIG. 10A and FIG. 10B and a second bonded portion 52 described below with reference to FIG. 11A and FIG. 11B.

FIG. 10A is a view (a front view) of the movable unit 20*b* when viewed from the subject side, and FIG. 10B is a cross-sectional view taken along arrows E to E shown in FIG. 10A. By an inner circumferential portion 31*g* of the image pickup element holding member 31 and a rear surface portion 11*b* of the image pickup element 11 are bonded to each other by the first bonded portion 51, the image pickup element 11 is held by the image pickup element holding member 31. The first bonded portion 51 is formed by curing a first bonding agent, and an ultraviolet curable resin or the like is adopted as the first bonding agent. By applying a liquid ultraviolet curable resin to the bonded portion and irradiating it with ultraviolet rays, the ultraviolet curable resin is chemically transformed into a solid. At that time, the image pickup element holding member 31 and the first bonding agent are bonded, and the first bonding agent and the image pickup element 11 are bonded to each other so as to form the first bonded portion 51, and the image pickup element 11 is bonded to and fixed to the image pickup element holding member 31.

Further, as described above, the connecting member 38 is fastened to the image pickup element holding member 31 by the screws 45. If the image pickup element 11 is fixed to the image pickup element holding member 31 by the first bonded portion 51 and the second bonded portion 52 and then the connecting member 38 is attached to the image pickup element holding member 31 by the screws 45, there is a possibility that the image pickup element holding member 31 is slightly deformed by a stress caused by a tightening torque of the screws 45. As a result, there is a concern that a positional displacement of the image pickup element 11 may occur.

In order to avoid this problem, in the present embodiment, as shown in FIG. 10A, the first bonded portion 51 is formed by applying the first bonding agent to an upper side and a lower side of the image pickup element 11 and curing the first bonding agent. As a result, a configuration, in which the connecting member 38 extending in a right and left direction with respect to the image pickup element holding member 31 and the first bonded portion 51 do not overlap when viewed from the optical axis direction (a direction orthogonal to the image pickup plane 11*a* of the image pickup element 11), can be obtained. As a result, since the first bonding agent can be applied and cured after the connecting member 38 is attached to the image pickup element holding member 31 by the screws 45, it becomes possible to suppress the positional displacement of the image pickup element 11 and enhance the positional accuracy of the image pickup element 11. Further, by performing bonding in a pair of regions (a pair of regions along each side) sandwiching the center of the image pickup element 11, it is possible to stably fix the image pickup element 11 to the image pickup element holding member 31.

Figure 11A:
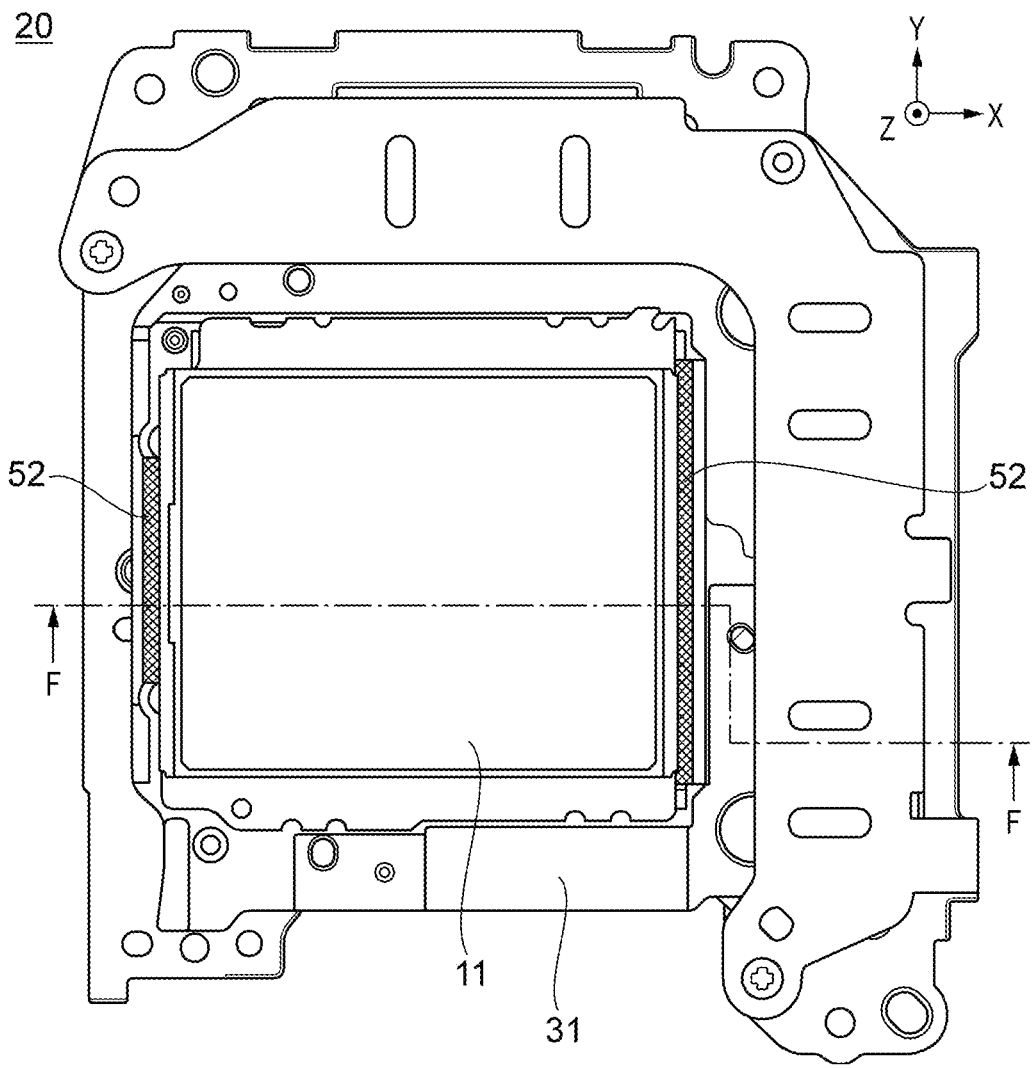
FIG. 11A is a front view of the first image blur correction unit.
Figure 11B:
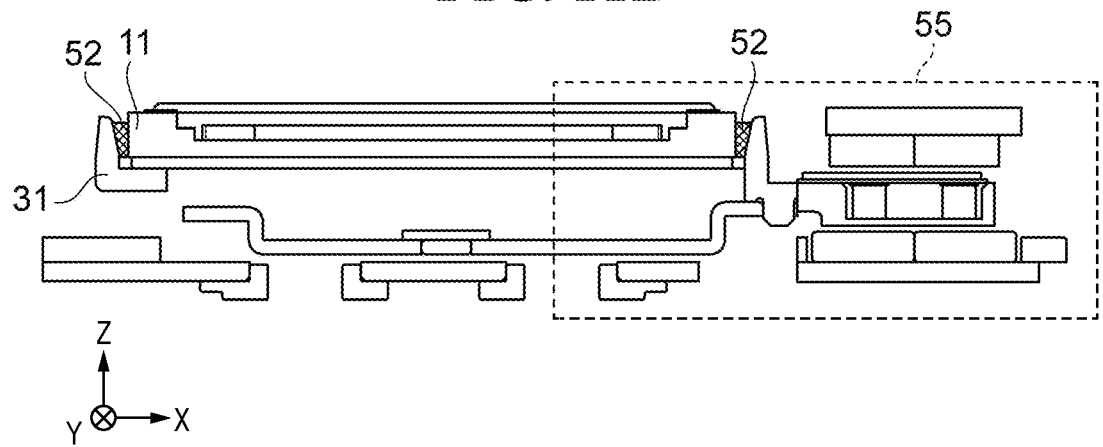
FIG. 11B is a cross-sectional view of the first image blur correction unit.
Figure 12:
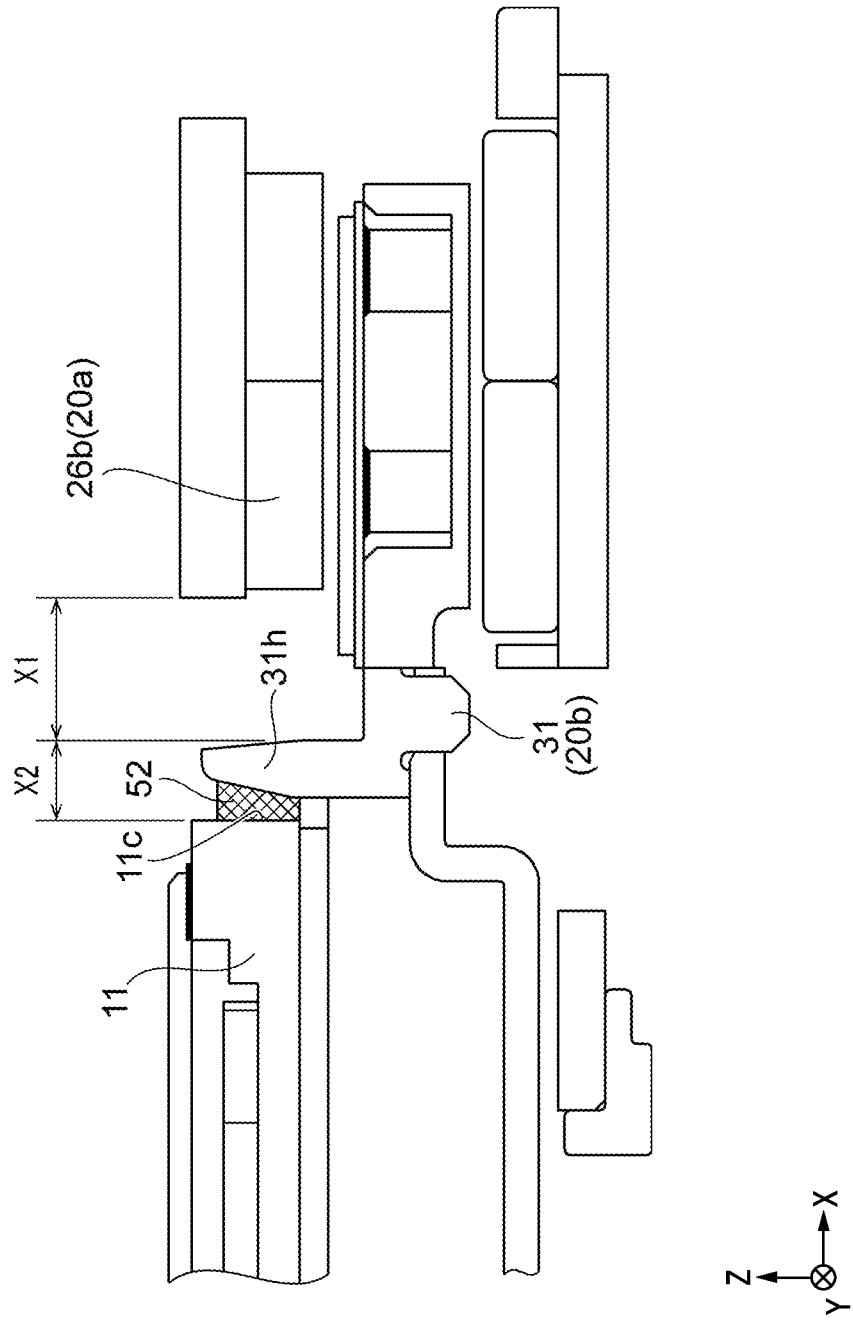
FIG. 12 is a partially enlarged view of the cross-sectional view of FIG. 11B.

FIG. 11A is a view (a front view) of the first image blur correction unit 20 when viewed from the subject side. Further, FIG. 11B is a cross-sectional view taken along arrows F to F shown in FIG. 11A. Furthermore, FIG. 12 is an enlarged view of a region 55 in FIG. 11B. From a viewpoint of enhancing the impact resistance of the image pickup apparatus 10, it is desirable that the image pickup element 11 is firmly fixed to the image pickup element holding member 31. Therefore, in the image pickup apparatus 10, in addition to the first bonded portion 51, the image pickup element 11 is bonded to and fixed to the image pickup element holding member 31 by the second bonded portion 52.

As with the first bonding agent that forms the first bonded portion 51, it is possible to use the ultraviolet curable resin or the like as the second bonding agent that forms the second bonded portion 52. As shown in FIG. 11A, the second bonding agent is applied to a left side and a right side of the image pickup element 11. At that time, as shown in FIG. 12, after the second bonding agent is applied between a side wall portion 31*h* of the image pickup element holding member 31 and a side surface portion 11*c* of the image pickup element 11, the second bonded portion 52 is formed by curing the second bonding agent, and the image pickup element 11 is bonded to and fixed to the image pickup element holding member 31.

In this way, in the image pickup apparatus 10, the first bonded portion 51 bonds the upper side and the lower side of the image pickup element 11, the second bonded portion 52 bonds the left side and the right side of the image pickup element 11, and the first bonded portion 51 and the second bonded portion 52 are disposed so as not to overlap each other when viewed from the optical axis direction. Further, the rear surface portion 11*b* of the image pickup element 11 is bonded by the first bonded portion 51, and the side surface portion 11*c* of the image pickup element 11 is bonded by the second bonded portion 52. By adopting such a configuration, it becomes possible to hold the position of the image pickup element 11 with respect to the image pickup element holding member 31 with high accuracy even if impacts (external forces) from various directions are applied to the image pickup apparatus 10.

Next, the difference between the first bonded portion 51 and the second bonded portion 52 will be described. The first bonded portion 51 bonds the image pickup element 11 to the image pickup element holding member 31 in a wide range so as to cover the rear surface portion 11*b* of the image pickup element 11 and the inner circumferential portion 31*g* of the image pickup element holding member 31. Therefore, in the case of using a low viscosity bonding agent as the first bonding agent, there is a possibility that since the first bonding agent spreads on the rear surface portion 11*b* at the time of applying the first bonding agent, covering on the inner circumferential portion 31*g* becomes shallow. Therefore, it is desirable to adopt a high viscosity bonding agent for the first bonded portion 51 so as to cover both the rear surface portion 11*b* and the inner circumferential portion 31*g*.

On the other hand, as described above, the second bonded portion 52 is formed between the side wall portion 31*h* of the image pickup element holding member 31 and the side surface portion 11*c* of the image pickup element 11. Here, as shown in FIG. 12, it is necessary to provide a gap X1 between the movable unit 20*b* and the fixed unit 20*a* in order to secure a movable region of the movable unit 20*b*. Further, in order to hold the image pickup element 11 by the side surface portion, in the inside of the image pickup element 11, it is necessary to provide a space for applying the second bonding agent and a width X2 being the thickness of the side wall portion 31*h* of the image pickup element holding member 31. In order to reduce the size of the first image blur correction unit 20, it is desirable to reduce the width X2, and in the case of considering that the bonding agent is poured into such a narrow region, it is desirable to use a bonding agent having a low viscosity as the second bonding agent.

As described above, it is desirable to use a bonding agent having a viscosity lower than that of the first bonding agent as the second bonding agent. Further, since the first bonding agent is applied in a wider range than the second bonding agent, it is desirable to set the first bonded portion 51 as a main bonded portion and set the second bonded portion 52 as a sub bonded portion.

Further, since the image pickup apparatus 10 is expected to be used in various temperature environments, it is desirable that high impact resistance can be obtained even in various temperature environments. Here, considering that bonding strength of the bonding agent has a temperature dependence, in the first bonded portion 51 and the second bonded portion 52, it is desirable to combine bonding agents having different temperature characteristics in the bonding strength.

Figure 13:
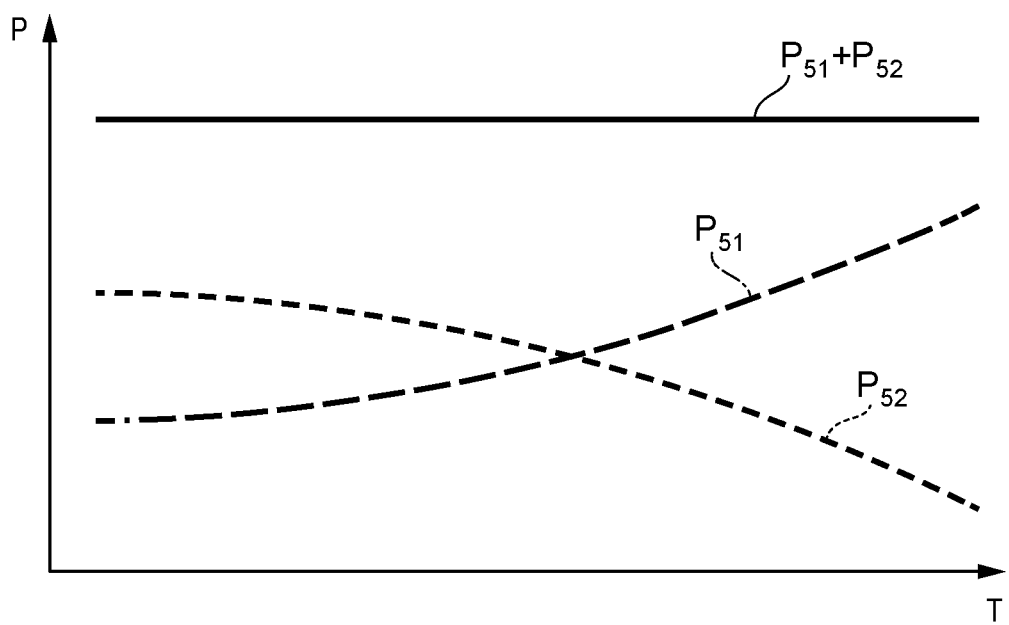
FIG. 13 is a diagram that shows temperature-strength characteristics of a first bonded portion and a second bonded portion.

FIG. 13 is a diagram for explaining a selection example of the first bonded portion 51 and the second bonded portion 52 in consideration of the temperature characteristic of the bonding strength (bonding strength-temperature characteristics). In FIG. 13, a horizontal axis indicates a temperature T, a vertical axis indicates a bonding strength P, a curved line P51 shows a temperature-bonding strength characteristic of the first bonded portion 51, and a curved line P52 shows a temperature-bonding strength characteristic of the second bonded portion 52. Further, a solid line P51+P52 shows the sum of the curved line P51 and the curved line P52, that is, the solid line P51+P52 shows a temperature characteristic of the overall bonding strength of the image pickup element 11 with respect to the image pickup element holding member 31.

As shown in FIG. 13, by combining the first bonded portion 51 that is resistant to a high temperature side and the second bonded portion 52 that is resistant to a low temperature side, it becomes possible to realize a holding mechanism of the image pickup element 11 that has the high impact resistance in a wide temperature range. Moreover, since the temperature in the vicinity of the image pickup element 11 tends to rise due to the influence of heat generation, etc. of the image pickup element 11 when the image pickup apparatus 10 is used, it is desirable to use a bonding agent, which exhibits a high bonding strength on the high temperature side, for the first bonded portion 51, which is the main bonded portion.

Although the present invention has been described in detail based on the preferred embodiments thereof, the present invention is not limited to these specific embodiments, and various embodiments within the range not deviating from the gist of the present invention are also included in the present invention. Further, each of the above-described embodiments is merely an embodiment of the present invention, and each embodiment can be appropriately combined.

For example, with respect to the magnet and the coil that constitute the VCM, which is the actuator, one of the magnet and the coil may be disposed in the fixed unit, and another of the magnet and the coil may be disposed in the movable unit. Further, with respect to the thrust magnet and the rear yoke that constitute the urging unit, one of the thrust magnet and the rear yoke may also be disposed in the fixed unit, and another of the thrust magnet and the rear yoke may also be disposed in the movable unit.

Further, in the case that the connecting member is disposed so as to extend in a vertical direction, the first bonded portion may be arranged on the left side and the right side of the image pickup element (the first bonding agent may be applied to the left side and the right side of the image pickup element), and the second bonded portion may be arranged on the upper side and the lower side of the image pickup element (the second bonding agent may be applied to the upper side and the lower side of the image pickup element). Further, in the case that the image pickup element holding member forms three sides when viewed from the optical axis direction and the connecting member is attached to the remaining one side so that an opening is formed, the first bonding agent may be applied at a position that does not overlap with the connecting member when viewed from the optical axis direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2021-021830, filed Feb. 15, 2021 and Japanese Patent Application No. 2021-076427, filed Apr. 28, 2021, which are hereby incorporated by reference herein in its entirety.

What is claimed is:

1. A drive device comprising:
a fixed member;
a movable member that is disposed so as to be capable of relatively moving in a predetermined range within a plane with respect to the fixed member;
a plurality of rolling members that are disposed between the fixed member and the movable member;
an actuator configured to drive the movable member; and
an urging unit configured to include a magnet and a magnetic body, and to urge the movable member to the fixed member via the rolling members,
wherein one of the magnet and the magnetic body is held by the movable member, and another of the magnet and the magnetic body is held by the fixed member, and
wherein a range, in which the magnet can move when the actuator is driven to move the movable member, does not protrude from an end of the magnetic body when viewed from a direction orthogonal to the plane.

2. The drive device according to claim 1,
wherein in a state that the magnet protrudes from the end of the magnetic body when viewed from the direction orthogonal to the plane, an urging force of the urging unit in a direction parallel to the plane is larger than that in a state that the magnet does not protrude from the end of the magnetic body.

3. The drive device according to claim 1,
wherein the magnetic body has a regulating portion that regulates moving of the movable member, and
wherein among moments generated within the plane and centered on abutting positions of the movable member and the regulating portion, the moment generated by a gravitational force is larger than the moment generated by the urging unit.

4. The drive device according to claim 3,
wherein the number of the abutting positions of the movable member and the regulating portion is two, and
wherein among moments generated within the plane and centered on the abutting position closer to a centroid of the movable member among the two abutting portions, the moment generated by the gravitational force is larger than the moment generated by the urging unit.

5. The drive device according to claim 1,
wherein at least three the rolling members are disposed, and
wherein the urging unit is disposed inside a triangle formed by the rolling members.

6. The drive device according to claim 1, further comprising:
a controller configured to control driving of the actuator, wherein the actuator comprises
a coil that is held by the movable member;
a magnet that is held by the fixed member;
a first detector configured to detect shake information of the fixed member; and
a second detector configured to detect relative position information of the movable member with respect to the fixed member, and
wherein the controller controls driving of the movable member by controlling a current flowing through the coil based on the shake information and the position information.

7. A drive device comprising:
a fixed member;
a movable member that is disposed so as to be capable of relatively moving in a predetermined range within a plane with respect to the fixed member;
a plurality of rolling members that are disposed between the fixed member and the movable member;
an actuator configured to drive the movable member; and
an urging unit configured to include a magnet and a magnetic body, and to urge the movable member to the fixed member via the rolling members,
wherein one of the magnet and the magnetic body is held by the movable member, and another of the magnet and the magnetic body is held by the fixed member, and
wherein in a case that a moving amount of the movable member from a reference position of the movable member with respect to the fixed member is larger than a predetermined value, a part of an attractive force generated between the magnet and the magnetic body acts as a force in a direction of returning the movable member to the reference position, and
in a case that the moving amount is not larger than the predetermined value, the attractive force does not act as the force in the direction of returning the movable member to the reference position.

8. An image blur correcting device comprising:
a fixed member;
a movable member that holds an image sensor or an image blur correction lens and is disposed so as to be capable of relatively moving in a predetermined range within a plane with respect to the fixed member;
a plurality of rolling members that are disposed between the fixed member and the movable member;
an actuator configured to drive the movable member; and
an urging unit configured to include a magnet and a magnetic body, and to urge the movable member to the fixed member via the rolling members,
wherein one of the magnet and the magnetic body is held by the movable member, and another of the magnet and the magnetic body is held by the fixed member, and
wherein a range, in which the magnet can move when the actuator is driven to move the movable member, does not protrude from an end of the magnetic body when viewed from a direction orthogonal to the plane.

9. An image blur correcting device comprising:
a fixed member;
a movable member that holds an image sensor or an image blur correction lens and is disposed so as to be capable of relatively moving in a predetermined range within a plane with respect to the fixed member;
a plurality of rolling members that are disposed between the fixed member and the movable member;
an actuator configured to drive the movable member; and
an urging unit configured to include a magnet and a magnetic body, and to urge the movable member to the fixed member via the rolling members,
wherein one of the magnet and the magnetic body is held by the movable member, and another of the magnet and the magnetic body is held by the fixed member, and
wherein in a case that a moving amount of the movable member from a reference position of the movable member with respect to the fixed member is larger than a predetermined value, a part of an attractive force generated between the magnet and the magnetic body acts as a force in a direction of returning the movable member to the reference position, and in a case that the moving amount is not larger than the predetermined value, the attractive force does not act as the force in the direction of returning the movable member to the reference position.

10. An image pickup apparatus comprising:

a fixed member;

a movable member that holds an image sensor or an image blur correction lens and is disposed so as to be capable of relatively moving in a predetermined range within a plane with respect to the fixed member;

a plurality of rolling members that are disposed between the fixed member and the movable member;

an actuator configured to drive the movable member; and an urging unit configured to include a magnet and a magnetic body, and to urge the movable member to the fixed member via the rolling members, wherein one of the magnet and the magnetic body is held by the movable member, and another of the magnet and the magnetic body is held by the fixed member, and wherein a range, in which the magnet can move when the actuator is driven to move the movable member, does not protrude from an end of the magnetic body when viewed from a direction orthogonal to the plane.

11. An image pickup apparatus according to claim 10, further comprising:

a connecting member that forms at least one opening in a state of being connected to the movable member; and a first bonded portion that is provided between a rear surface portion of the image sensor and an inner circumferential portion of the movable member, and wherein the connecting member and the first bonded portion do not overlap when viewed from a direction orthogonal to an image pickup plane of the image sensor.

12. The image pickup apparatus according to claim 11, wherein the first bonded portion is provided in a pair of regions sandwiching the center of the image sensor in a plane parallel to the image pickup plane.

13. The image pickup apparatus according to claim 11, wherein a second bonded portion is provided between a side surface portion of the image sensor and a side wall portion of the movable member.

14. The image pickup apparatus according to claim 13, wherein the second bonded portion is provided in a pair of regions sandwiching the center of the image sensor in a plane parallel to the image pickup plane.

15. The image pickup apparatus according to claim 13, wherein the first bonded portion and the second bonded portion do not overlap when viewed from the direction orthogonal to the image pickup plane.

16. The image pickup apparatus according to claim 13, wherein the first bonded portion and the second bonded portion have different characteristics.

17. The image pickup apparatus according to claim 16, wherein the first bonded portion has a higher bonding strength at high temperature than the second bonded portion.

18. The image pickup apparatus according to claim 16, wherein in a case of being applied to the image sensor and the movable member, a viscosity of a liquid first bonding agent used for forming the first bonded portion is different from a viscosity of a liquid second bonding agent used for forming the second bonded portion.

19. The image pickup apparatus according to claim 18, wherein the viscosity of the second bonding agent is smaller than the viscosity of the first bonding agent.

20. An image pickup apparatus comprising:

a fixed member;

a movable member that hold an image sensor or an image blur correction lens and is disposed so as to be capable of relatively moving in a predetermined range within a plane with respect to the fixed member;

a plurality of rolling members that are disposed between the fixed member and the movable member;

an actuator configured to drive the movable member; and an urging unit configured to include a magnet and a magnetic body, and to urge the movable member to the fixed member via the rolling members, wherein one of the magnet and the magnetic body is held by the movable member, and another of the magnet and the magnetic body is held by the fixed member, and wherein in a case that a moving amount of the movable member from a reference position of the movable member with respect to the fixed member is larger than a predetermined value, a part of an attractive force generated between the magnet and the magnetic body acts as a force in a direction of returning the movable member to the reference position, and in a case that the moving amount is not larger than the predetermined value, the attractive force does not act as the force in the direction of returning the movable member to the reference position.

* * * * *